United States Patent [19]

Kang et al.

[11] Patent Number: 5,339,695
[45] Date of Patent: Aug. 23, 1994

[54] FLUIDIC GAS FLOWMETER WITH LARGE FLOW METERING RANGE

[75] Inventors: Sukhvinder S. Kang, Rochester, Minn.; Bharatan R. Patel, Etna; William E. Nutt, Enfield, both of N.H.; Kirankumar K. Kothari, Hoffman Estates, Ill.

[73] Assignee: Gas Research Institute, Chicago, Ill.

[21] Appl. No.: 877,147

[22] Filed: May 1, 1992

[51] Int. Cl.⁵ .......................... G01F 7/00; G01F 1/20
[52] U.S. Cl. ..................... 73/861.19; 73/861.95; 73/195
[58] Field of Search ............... 73/195, 861.95, 861.19, 73/204.26

[56] References Cited

U.S. PATENT DOCUMENTS

| | | | |
|---|---|---|---|
| 4,107,990 | 8/1978 | Ringwall | 73/861.19 |
| 4,458,709 | 7/1984 | Springer | 73/861.95 |
| 4,483,200 | 11/1984 | Togawa et al. | 73/861.95 |
| 4,501,144 | 2/1985 | Higashi et al. | 73/204.26 |
| 4,550,614 | 11/1985 | Herzl | 73/861.19 |
| 4,565,098 | 10/1986 | Herzl | 73/861.19 |
| 4,733,559 | 3/1988 | Aine et al. | 73/195 |
| 4,838,091 | 6/1989 | Markland et al. | 73/861.19 |
| 5,020,373 | 6/1991 | Kamiunten et al. | 73/195 |

FOREIGN PATENT DOCUMENTS 2177204 1/1987 United Kingdom ................. 73/195

Primary Examiner—Richard E. Chilcot, Jr.
Assistant Examiner—Harshad Patel
Attorney, Agent, or Firm—James Creighton Wray

[57] ABSTRACT

The present invention provides a wide range fluid flowmeter, having a body with a central air flow passage and a target in the air flow passage to direct fluid flow to one of the first and second flow loops. The fluid alternates between the first and second flow loops to create an oscillatory system, whose frequency can be measured to determine fluid flow rate. A preferred frequency measuring device is a piezoelectric diaphragm provided within the body of the flowmeter. In a preferred embodiment, a low flow rate sensor is provided in a nozzle of the flowmeter proximal the inlet to the body of the oscillatory, high flow rate flowmeter. The low flow rate sensor can incorporate a convection system which measures flow rates beyond the lower scale of the oscillatory flowmeter, thereby providing an apparatus and a method for measuring flow rates in a compact flowmeter, and with greater efficiency than previous apparatuses and methods. In its preferred embodiment, the low flow rate sensor is a time-of-flight (TOF) sensor provided in a constricted nozzle proximal the inlet to the oscillatory flowmeter.

25 Claims, 4 Drawing Sheets

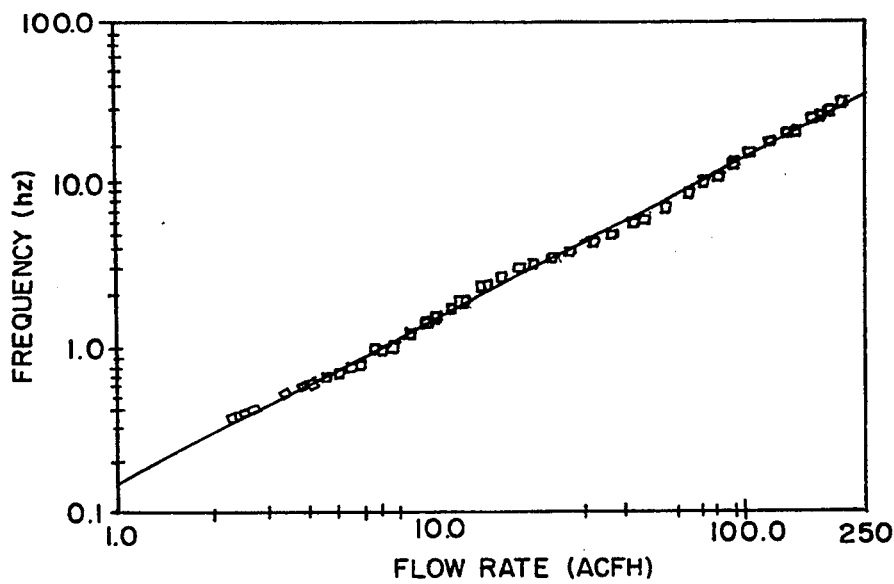
FIG. 3
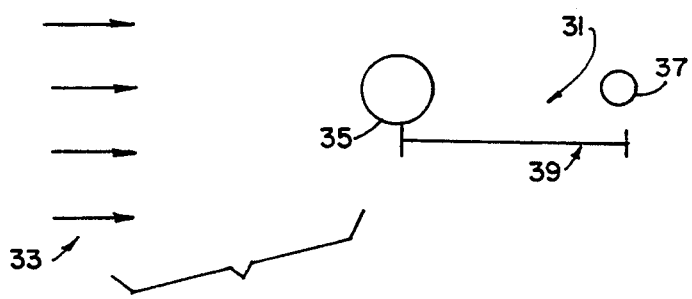
FIG. 4
FIG. 5
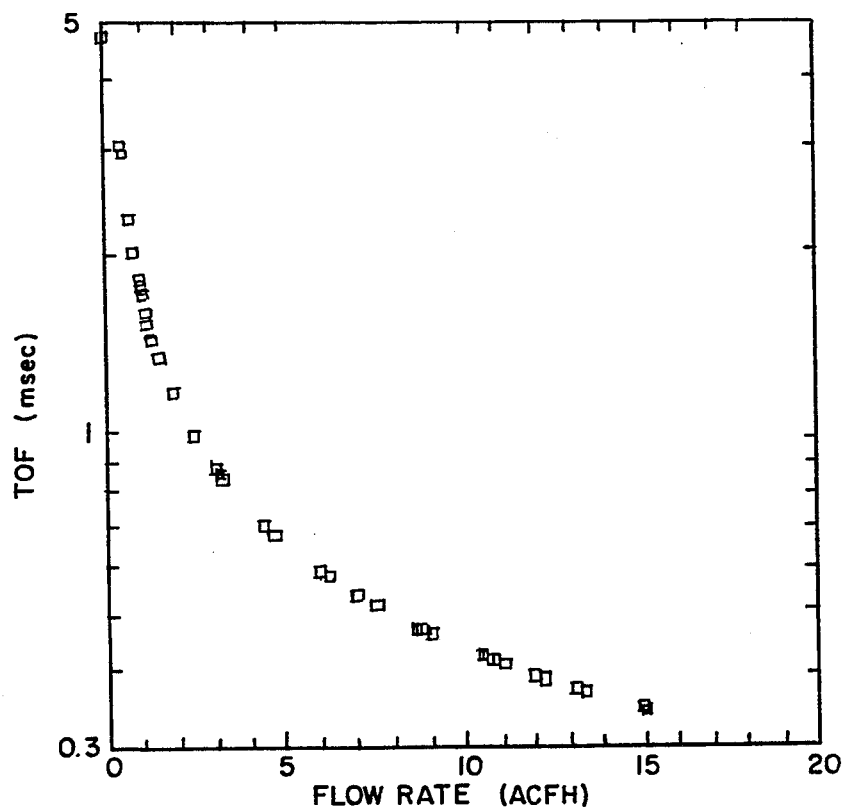

FLUIDIC GAS FLOWMETER WITH LARGE FLOW METERING RANGE

BACKGROUND OF THE INVENTION

Natural gas supply to residential or commercial customers requires reliable compact flowmeters with high accuracy, large flow metering range, and low pressure drop. Currently used displacement-type flowmeters are bulky and have moving mechanical parts which wear with time, resulting in drift of calibration.

Numerous flowmeters based on the fluidic oscillator concept have been developed in recent years. The earliest example of a liquid oscillator flowmeter is probably that of Wilson (1970), while more recent gas flowmeters have been described by Kawano (1986), Kalsi (1988), and Yasuda (1989). These fluidic flowmeters have been unsuitable for metering of residential natural gas flow because it has not been possible to combine the twin requirements of high rangeability and low pressure drop into a single device Kawano (1986) tried to overcome this limitation by using two fluidic flowmeters with overlapping range. However, this concept uses a mechanical valve to switch the flow from one flowmeter to the other, thus introducing a moving part which is susceptible to wear and failure. Yasuda (1989) combines his fluidic flowmeter with a semiconductor flowmeter to achieve the required rangeability with low pressure drop. Yasuda's fluidic flowmeter has a useful rangeability of only 20 and the semiconductor flowmeter has metering errors as large as 10 percent at the lower flow rate range.

Velocity measurement devices based on the thermal time-of-light (TOF) have previously been demonstrated by Bradbury (1971) for turbulent flow measurements and by Wesphal (1981) for measurement of wall shear stresses in gas flow boundary layers. Both of these devices have temperature sensors upstream as well as downstream of the pulse heated wire so as to measure flow direction as well as velocity. That implementation, however, prevents the measurement of gas velocities lower than about 0.3 m/s as reported by both authors. The ability to measure the very low gas velocities is critical in applying the TOF sensor to our low flow rate measurement range.

Needs exist for new flowmeters which are inexpensive and compact, which have no moving parts, which have high accuracies in measuring flow rates over varying ranges down to zero, and with low pressure drops.

SUMMARY OF THE INVENTION

We have developed a new compact flowmeter which has no moving parts, and a high flow measurement range. The flowmeter uses a thermal time-of-flight concept to measure low flow rates, and a fluidic oscillator concept for the high flow rate range. The combination of these two concepts results in a flowmeter with a very high flow measurement range (rangeability greater than 800) designed for metering residential natural gas flows.

The main elements of the preferred fluidic flowmeter consist of an inlet nozzle, a target and divider plates, which separate the main flow passage from the feedback passages. The operating principle of the invention is as follows.

Gas enters the device through the inlet nozzle, emerges as a jet which impinges on the target, and is deflected towards one side wall of the main passage. Part of the deflected gas flows back through the feedback passage and impinges on the main jet. The momentum added to the main jet by the feedback gas jet deflects the main jet towards the other side wall of the main passage. The process repeats sending gas into the opposite feedback passage and producing a second feedback jet which directs the main jet to the first wall. The process is alternately repeated for as long as gas flows through the device.

Thus, the fluidic flowmeter basically uses a positive feedback oscillator. The oscillation frequency is proportional to the jet velocity and therefore to flow rate, and the device can be used for flow metering. A major attraction is that the new fluidic flowmeter has no moving parts, making it intrinsically rugged and reliable. Furthermore, because the flowmeter does not wear with use, its calibration remains unchanging with time.

In a preferred embodiment, one fluidic flowmeter has a flow measurement range from 2.2 to 200 CFH (rangeability of 90). Its pressure drop at the maximum natural gas flow rate of 200 CFH is less than 0.75 inches of water.

The invention provides a new TOF flowmeter for metering in lower flow ranges. This new meter is integrated with the fluidic flowmeter to form a single compact flowmeter with the desired flow metering range.

The TOF sensor has a pulse heated wire and a temperature sensor positioned at a known distance from the pulse heated wire. The wire is made of a metal alloy that can be heated by passing an electric current through it. A short duration current pulse is periodically applied to heat the wire. Heat flows from the wire to the surrounding gas starting from the time the current pulse is applied. When there is a flow of gas from the wire towards the sensor, the flow transports the heated gas to the sensor by convection. The time interval between the application of the current pulse and the arrival of the heated gas at the temperature sensor is called the "Time-of-Flight" (TOF). Because the distance between the pulsed wire and the temperature sensor is fixed, the TOF provides a measure of the gas flow velocity. When there is no gas flow, the heat reaches the temperature sensor by thermal diffusion through the gas so that the TOF is finite even at zero gas velocity.

The present invention provides a TOF sensor which consists of a pulse heated wire and a single temperature sensor downstream of the wire. This single temperature sensor arrangement allows the accurate measurement of gas velocities much lower than the previously demonstrated limit of 0.3 m/s; in fact, this invention has demonstrated repeatable TOF even at zero velocity.

The present invention has combined the TOF sensor with a nozzle to create a new device such that the TOF measured with this device provides a measure of the gas flow rate rather than just the gas velocity.

This invention also provides a means to substantially compensate for variations in the thermophysical properties of the gas being metered. The ability to automatically compensate for variations in gas properties is critical for natural gas metering because the composition of the gas differs from well to well. Gas properties change with gas composition.

The TOF flow sensor is placed in the throat of the nozzle in the fluidic flowmeter to create a compact device with a high rangeability. Positioning the TOF sensor in the nozzle creates a new device which measures the gas volumetric flow rate rather than just the gas velocity. One example has a circular nozzle, a 25

μm diameter pulsed wire and a 5 μm diameter sensor to independently measure the low flow range.

In one embodiment, a pulsed wire and a sensor wire are positioned in the flow stream emerging from the nozzle. With the ability to measure TOF to within 1 μs, the measurement uncertainty is less than±0.5 percent of reading over the 0.25 to 15 CFH flow rate range. In tests, TOF versus flow rate data were repeatable within the expected uncertainty band. That data verifies the suitability of the TOF flowmeter for the low flow rate range.

Because the TOF concept relies on heat transport by the gas, its response is affected by the thermophysical properties of the gas being metered. Because the composition and properties of natural gas differ from well to well, the flowmeter calibration must be compensated for gas property variations. An in-situ method uses the TOF measured at zero velocity to automatically compensate the flowmeter calibration for the properties of the gas being metered. The method was verified through tests with air and argon gases whose properties differ to a much greater degree than those of samples of natural gas from different wells. TOF flowmeter behavior was tested for argon and air when it is compensated by the zero flow factor. That data verifies that the method is substantially able to compensate for variations in gas properties.

This invention combines TOF and fluidic principles to create a new gas flowmeter with high accuracy, high rangeability and low pressure drop. In a preferred embodiment, the TOF flowmeter is integrated directly into the constructed nozzle of the fluidic flowmeter. This method of integration retains basic compact size of a fluidic flowmeter with no impact on oscillation or pressure drop characteristics.

The present invention provides a flowmeter with high flow measurement range. The flowmeter uses a thermal TOF sensor integrated with a nozzle to measure low flow rates and a fluidic oscillator to measure high flow rates. The flowmeter is compact and has no moving parts.

One embodiment of the fluidic oscillator made according to the invention has demonstrated its ability to meter flows from 2.2 to 200 CFH with low pressure drop. One embodiment of a new TOF sensor has a pulse heated wire and a single temperature sensor and is integrated with a nozzle to meter flows from 0 to 15 CFH.

The TOF flowmeter has means to automatically compensate the calibration of the TOF sensor for variations in gas properties.

The invention provides the integrating of the TOF flowmeter directly into the nozzle of the fluidic flowmeter so as not to impact the size or the oscillation and pressure drop characteristics of the fluidic flowmeter.

Each of the concepts that form the new flowmeter has been verified using laboratory demonstration models.

In a preferred embodiment, the fluidic flowmeter has a body an inlet and an outlet. A target lies in a center main flow passage near the outlet, first and second opposite flow-directing feedback passage loops extend on opposite sides of the main flow passage. The loops have respective first and second auxiliary inlets near the target and first and second auxiliary outlets near the inlet of the main flow passage for alternating flow back and forth in the main passage from one side to another. A frequency sensing means is connected to the body for determining frequency of oscillations and flow indicating means is connected to the frequency sensing means for indicating flow through the inlet and outlet.

Preferably a nozzle is connected to the inlet, and a time-of-flight sensor connected to the nozzle for sensing relatively low flows through the nozzle and through the inlet. The frequency sensing means may be a piezoelectric diaphragm.

A preferred meter has first and second side walls placed between the center main flow passage and the first and second opposite flow-directing feedback passage loops respectively. The target preferably has opposite, identical director sides adjacent the first and second auxiliary inlets for directing fluid into the inlets. An intermediate director target point bisects the center main flow passage for funneling fluid to the first or the second director side.

A preferred sensor incorporates a heating element and a heat detection element, wherein fluid flow rate is detected through pulsing the heating element to heat the ambient fluid and measuring the subsequent time lapse provided before the heated fluid is detected by the detector. A rate flow computer is connected to the time-of-flight sensor for computing the flow velocity from the time between pulse and detection across a distance between the heating element and the heating detector. The heating element may be a pulse heated wire provided within the nozzle, with the heat detector provided downstream from the heating wire within the nozzle.

The fluidic flowmeter apparatus preferably has a low flow range sensor provided in sequence in a fluid flow with a high flow range meter. The high flow range meter is preferably an oscillator-type meter, wherein the fluid flow rate is measured by determining the frequency of flow oscillations. The low flow range-sensor is preferably a convection sensor, wherein the convection sensor incorporates a pulse heated element and a heat detection element provided downstream a given distance from the pulse heated element. Both the pulse heated element and the detection element are provided within the fluid flow for measuring flow rates. In a preferred embodiment, the low flow rate sensor element is within a constricted nozzle of the high flow range meter, with the constricted nozzle allowing detection of lower flow rates than possible by the high flow rate meter.

The present invention provides a means for measuring flow rate, wherein a low flow rate sensor is situated upstream from a high flow rate meter. The low flow rate sensor is located in a constricted inlet to the high flow rate meter and is for measuring flow rates below the range of the high flow rate meter.

The low flow rate meter measures flow rates using a convection sensor provided within the inlet to a high flow rate meter; the high flow rate meter measures flow rates by measuring the frequency of oscillations in an oscillation meter.

The low flow rate sensor is preferably a time-of-flight sensor.

These and further and other objects and features of the invention are apparent in the disclosure, which includes the above and ongoing written specification, with the claims and the drawings.

BRIEF DESCRIPTION OF THE DRAWINGS

FIG. 3 shows breadboard fluidic flowmeter test results with air flow.

FIG. 4 is a schematic TOF flow sensor.

FIG. 5 shows TOF flowmeter test results with air flow.

DETAILED DESCRIPTION OF THE DRAWINGS

Figure 1:
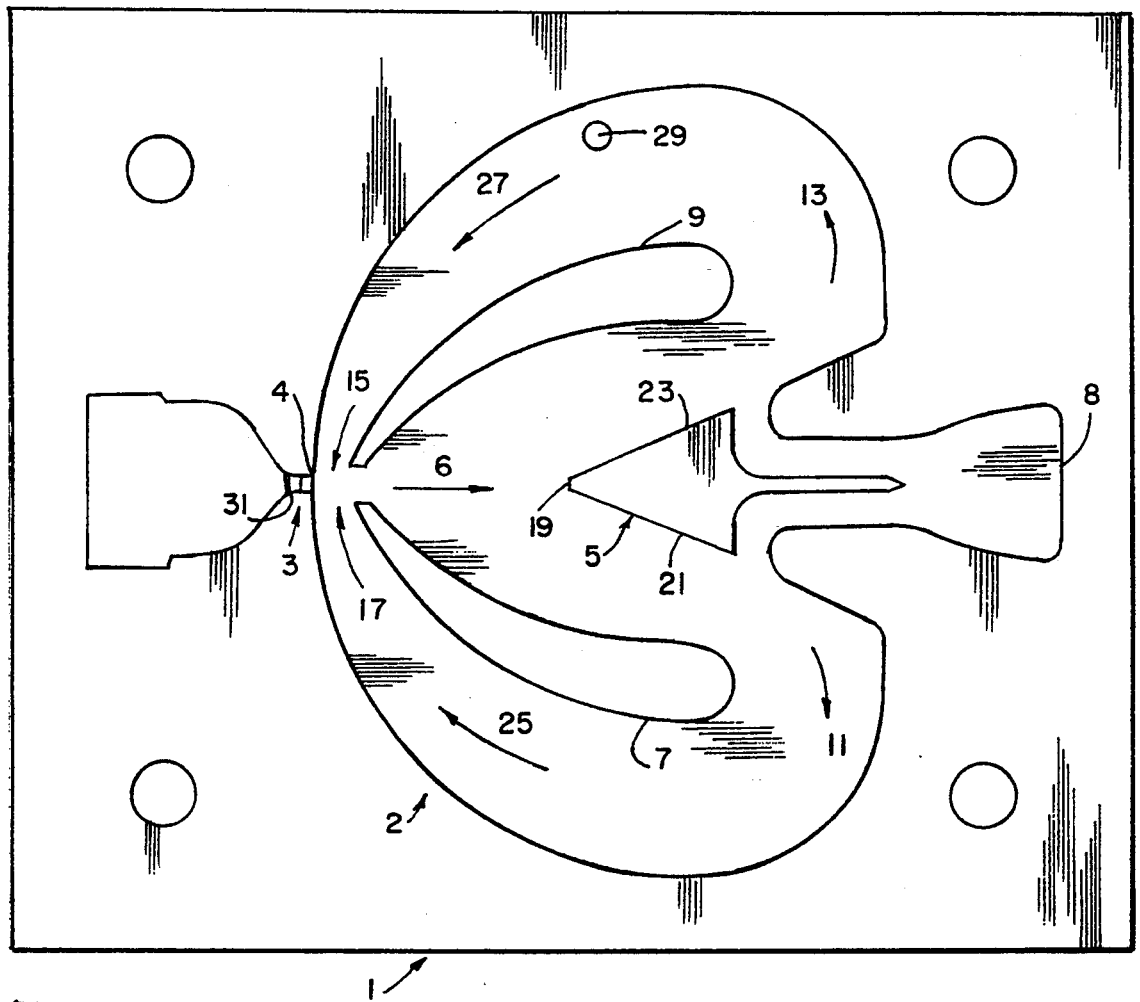
FIG. 1 is a geometry of a fluidic flowmeter.
Figure 2:
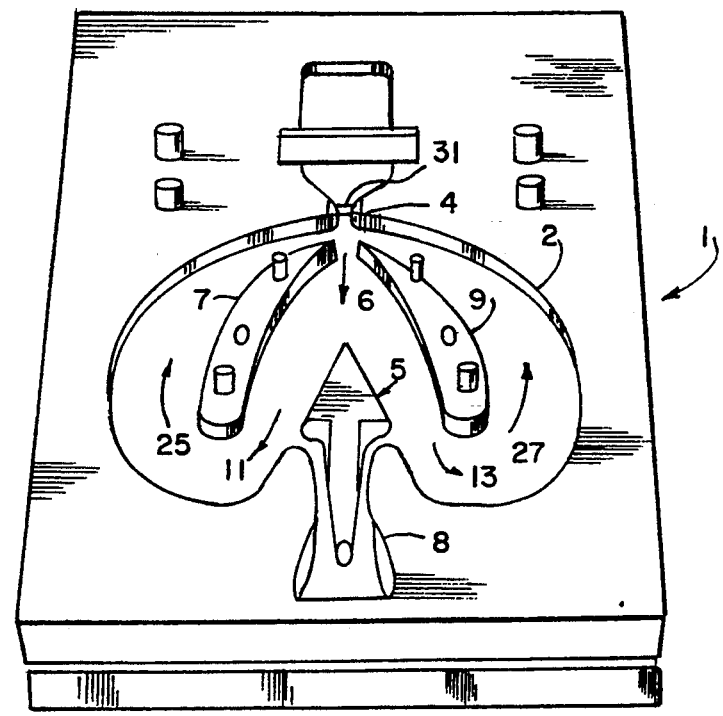
FIG. 2 is a top perspective of one fluidic flowmeter.

FIGS. 1 and 2 show the geometry of the baseline fluidic flowmeter in a preferred embodiment of the present invention. The flowmeter, generally indicated by the numeral 1, incorporates an inlet nozzle 3 prescribing an inlet 4 to a body 2 having an outlet 8. The body 8 incorporates a target 5 bisecting a central main air flow passage as indicated by arrow 6, and first and second divider plates or side walls 7 and 9. The first and second side walls 7 and 9 lie between the center main flow passage 6 and first and second opposite flow-directing feedback passage loops 25 and 27. The loops 25 and 27 have respective auxiliary inlets 11 and 13, and auxiliary outlets 17 and 15. Fluid enters the body 2 through inlet 4 and travels along the center main flow passage 6. The target has a director point 19 intermediate to identical director sides 21 and 23. The fluid is directed or funneled to one side of the director point 19 and is directed by either director side 21 or 23 into adjacent auxiliary inlets 11 or 13, through loops 25 or 27, and out of auxiliary outlets 15 or 17 near the inlet 4. The fluid exiting auxiliary outlet 15 or 17 pushes against the flow of fluid entering the body 2 through the inlet 4, thereby causing a slight change of direction of the fluid flow in the center main flow passage. This directs the fluid away from the director side 21 or 23 and into the opposite loop. The fluid flow in the opposite loop, in turn affects the fluid entering the body 2 at the inlet 4, and the process again reverses. The result is an oscillating system wherein fluid flow is alternately directed off of director sides 21 and 23 into passage loops 25 and 27. The frequency of these oscillations can be measured by any suitable means, but a piezoelectric diaphragm 29 is a preferred embodiment. The diaphragm converts pressure changes caused by the alternating fluid flows to electrical signals, which can then be measured for oscillation frequency. These frequencies are compared to known values, and the rate of flow of fluid can be determined.

Figure 7:
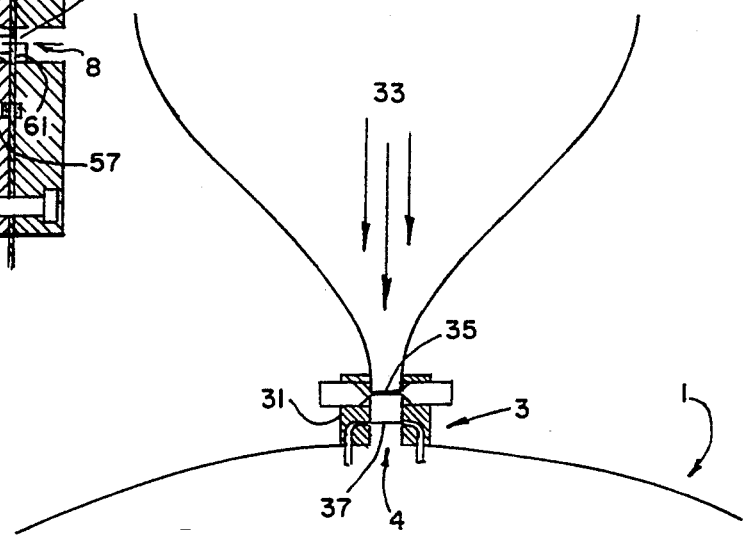
FIG. 7 shows a TOF flow sensor integrated into a fluidic flowmeter nozzle.

In a preferred embodiment of the present invention, a convection sensor 31, shown in FIGS. 1 and 2 and further detailed in FIGS. 4 and 7, is provided within the constricted nozzle 3.

FIG. 3 shows the flow versus oscillation frequency characteristics of the fluidic flowmeter. The flowmeter within the body 2 has a flow measurement range from 2.2 to 200 CFH (rangeability of 90), and a pressure drop at the maximum natural gas flow rate of 200 CFH is less than 0.75 inches of water. The oscillation flowmeter is operable at flow measurement rates above 2.2 CFH. A preferred embodiment of the present invention provides a sensor in sequence with the oscillation flowmeter for measuring low flow rates to 0 CFH. The preferred low flow sensor is a time-of-flight sensor provided in the nozzle 4, which provides a constricted air flow upstream from the high flow rate oscillation flowmeter.

In FIG. 4, the fluid flow 33 passes over the time-of-flight sensor 31 within the nozzle. The TOF sensor 31 incorporates a heating element 35 and a heating sensing element 37. The heating element 35 is preferably a pulse heated wire, and the heat sensing element 37 is preferably a temperature sensor positioned at a known distance downstream from the wire 35. A short pulse is delivered to the ambient air surrounding the pulse wire 35, and the temperature sensor 37 reads the temperature of the fluid downstream, detecting an increase as caused by the pulse. Computing the time elapsed between the pulse and detection across a given distance 39 between the wire 35 and the sensor 37 allows for detection of flow rates between 0 and 15 CFH flow rate.

In a preferred embodiment, the TOF flow sensor is placed in the throat of the nozzle, with the heating element 35 being a 25 $\mu m$ diameter pulsed wire, and the temperature sensing element 37 being a 5 $\mu m$ diameter sensor provided in the flow path 33 to independently measure the low flow range.

The measured TOF versus flow rate characteristics of the embodiment are shown in FIG. 5. With the ability to measure TOF to within 1 $\mu s$, the measurement uncertainty is less than $\pm 0.5\%$ of reading over 0.25 to 15 CFH flow rate range The TOF versus flow rate data was repeatable within the expected uncertainty band, and the data verifies the suitability of the TOF flowmeter for the low flow rate range.

A calibration of TOF versus flow rate (such as FIG. 5) is sensitive to the properties of the gas being metered. Because the composition and properties of natural gas differ from well to well, it is important that the flowmeter calibration be compensated for variations in gas properties. The invention provides a gas properties compensation method which allows the TOF flowmeter to meter gases over a wide range of gas properties. The method consists of compensating the flowmeter calibration by using the TOF measured at zero flow conditions in the gas being metered. Because those compensation measurements are made in-situ, the flowmeter does not require gas properties information to be supplied separately. This compensation scheme was verified through the flow measurements with air and argon gases. The thermophysical properties differences between argon and air are much greater than the differences expected between various samples of natural gas.

Figure 6:
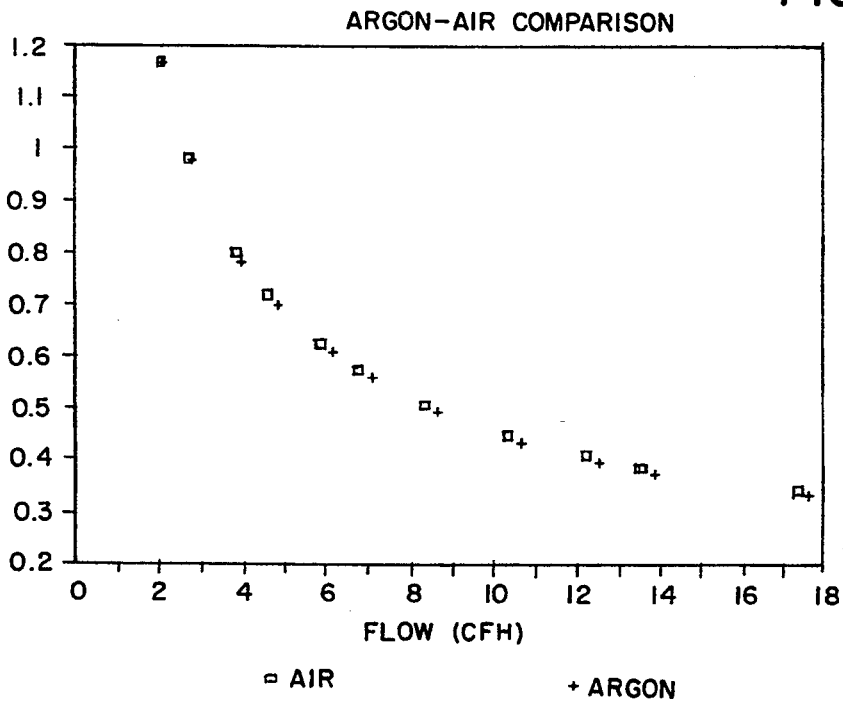
FIG. 6 shows test results for a TOF flowmeter gas properties compensation method.

The data for air and argon are shown in FIG. 6 for the higher flow range of the breadboard flowmeter where gas property compensation errors are dominant. As the data of FIG. 6 shows, the compensation method is able to substantially compensate for variations in gas properties between air and argon. The data shows that, by using a device calibrated in air and compensated for gas properties with the present method, the flow rate of argon can be measured with an error less than $\pm 2.5$ percent of reading. That result, which agrees with analysis predictions, gives confidence in the analysis prediction of only a $\pm 1$ percent error for gas properties ranging from air to methane. Since different natural gas samples are expected to have less property differences than between air and methane, the measurement accuracy for natural gas metering is provided.

Those test results from laboratory devices confirm the performance capabilities of this new flow metering method. A single sensor TOF device senses flows from zero velocity and up. A new flowmeter consisting of a TOF device combined with a nozzle has the ability to accurately measure gas flows over a wide flow rate range. A method compensates for gas property differences between different gases.

FIG. 7 illustrates integrating the TOF flowmeter directly into the constricted nozzle of the fluidic flowmeter. This method of integration retains the basic compact size of the fluidic flowmeter with no impact on oscillation or pressure drop characteristics. Therefore, the low flow rate sensing means is provided in sequence with the high flow rate oscillation fluidic flowmeter, and a greater range is provided without sacrificing performance. The pulse wire 35 is provided adjacent and upstream of the sensing wire 37, so that the fluid flow 33 first passes over the pulse wire 35 and can be detected subsequently by the sensing wire 37 to determine fluid flow rate. The fluid passes through the low flow range apparatus 31 without impediment, and exits the nozzle at inlet 4 of the body 2.

Figure 8:
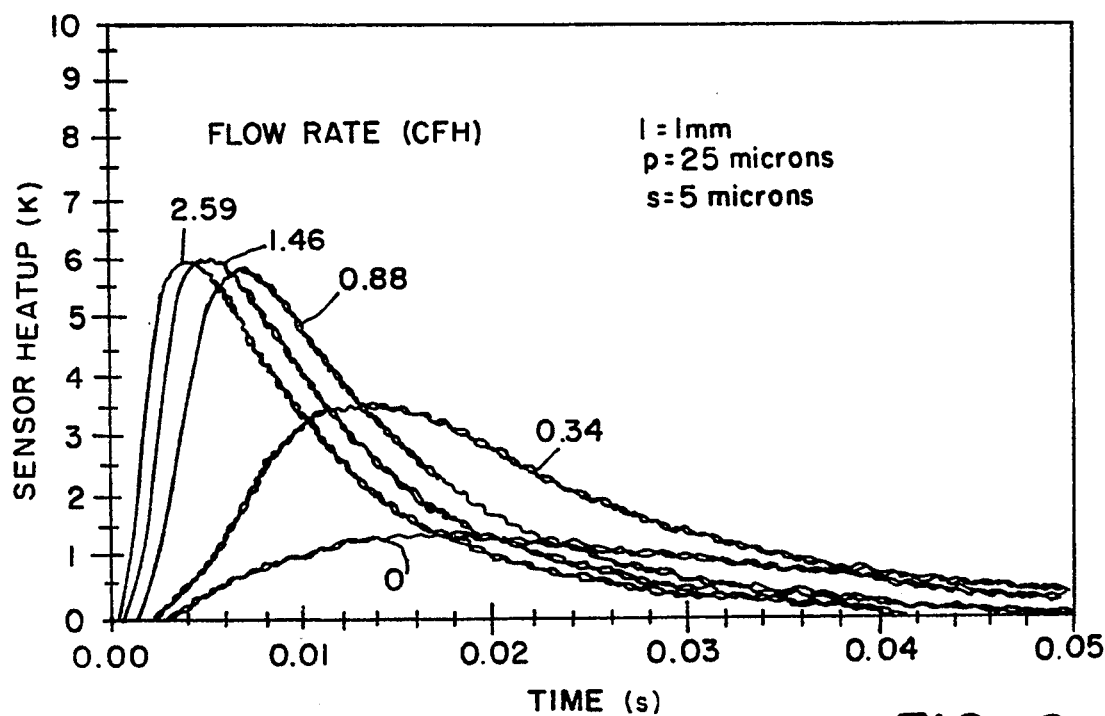
FIG. 8 is a typical TOF sensor response following a heat pulse to the pulser.

FIG. 8 shows the typical response of the sensor following a short current pulse applied to the pulser for a range of air flow rates through the nozzle. TOF is defined as the time from the start of the heat pulse to the time at which the sensor heats up by a fixed temperature.

Figure 9:
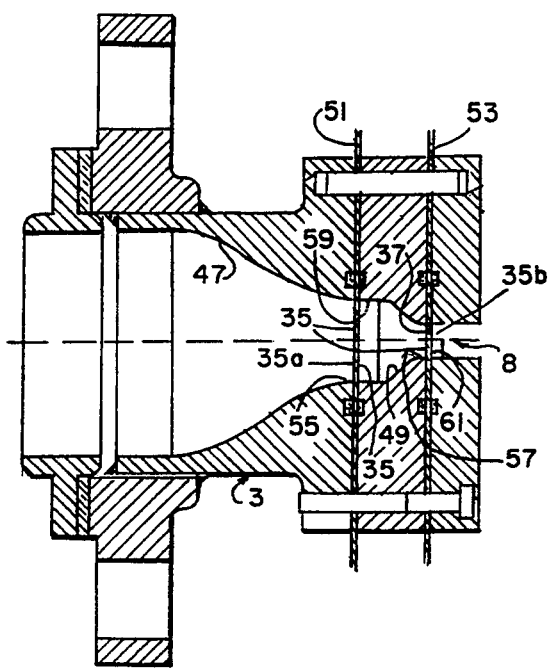
FIG. 9 is a high flow rangeability TOF flowmeter.

FIG. 9 shows one embodiment of a TOF sensor 31. The configuration shown consists of a two-stage nozzle 3 with TOF pulser 35 and sensor 37 positioned at the throat of each stage 47, 49 of the nozzle. Each TOF pulser and sensor 35, 37 consists of a disk 51, 53 with a hole 55, 57 corresponding to the nozzle throats 59, 61 and with the pulser wires 35a, 35b stretched across the diameter of the hole 55, 57 on either side of the disk 51, 53.

Figure 10:
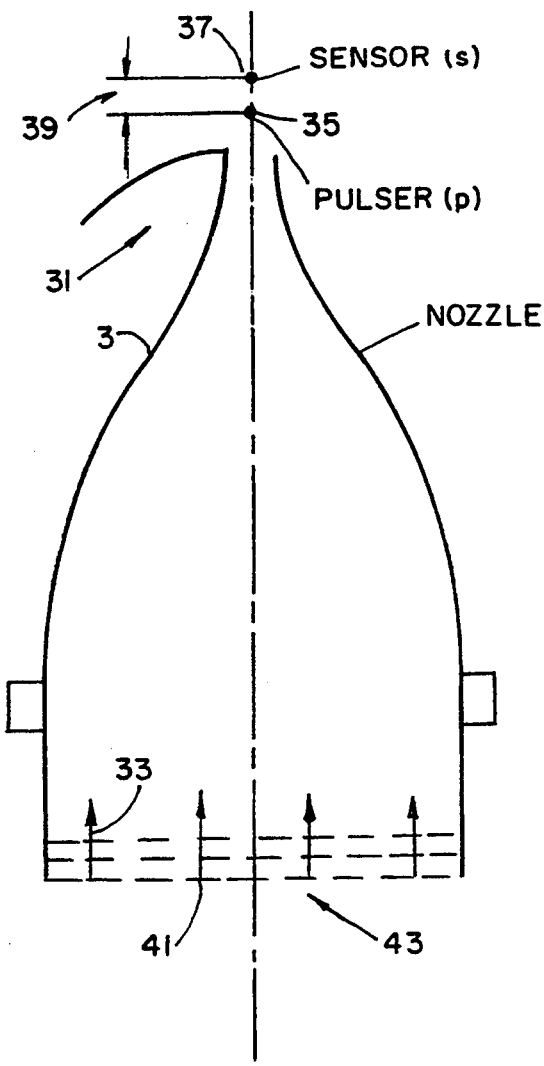
FIG. 10 is a schematic of a laboratory breadboard TOF flowmeter.

FIG. 10 shows a convection flowmeter 31 with a sensor 37 spaced a distance 39 from a pulser 35. The pulser is positioned near the inlet 4 to the oscillation flowmeter. A screen and baffles 41 at the inlet 43 of nozzle 3 smooth the flow of gas 33 at the entry.

The schematic of a laboratory breadboard model of the TOF flowmeter is shown in FIG. 10. It consists of a 25 μm diameter 2 mm long tungsten pulse heated wire (pulser) with a 5 μm diameter 1.25 mm long tungsten resistance thermometer (sensor) 37. The pulser and sensor wires are positioned parallel to each other and are separated by a distance 39 of about 1 mm in the direction of flow. This TOF device was calibrated against a known gas flow rate through a 5.5 mm diameter nozzle.

While the invention has been described with reference to specific embodiments, modifications and variations of the invention may be constructed without departing from the scope of the invention, which is defined in the following claims.

We claim:

1. A fluidic flowmeter comprising:
   a body having flow passages with an inlet and an outlet;
   a target in a center main flow passage near the outlet, first and second opposite flow-directing feedback passage loops on opposite sides of the main flow passage, the loops having respectively first and second auxiliary inlets near the target and first and second auxiliary outlets near the inlet of the main flow passage for alternating flow back and forth in the main passage from one side to another;
   frequency sensing means connected to the body for determining frequency of oscillations; and
   flow indicating means connected to the frequency sensing means for indicating flow through the inlet and outlet, further comprising a nozzle connected to the inlet and a time-of-flight sensor connected to the nozzle for sensing relatively low flow through the nozzle and through the inlet.

2. The apparatus of claim 1, further comprising the frequency sensing means being a piezoelectric diaphragm.

3. The apparatus of claim 1, further comprising first and second side walls placed between the center main flow passage and the first and second opposite flow-directing feedback passage loops respectively.

4. The apparatus of claim 1, further comprising the target having opposite, identical director sides adjacent first and second auxiliary inlets for directing fluid into the inlets, and an intermediate director point bisecting the center main flow passage for funneling fluid to the first or the second director side.

5. The apparatus of claim 1, further comprising the time-of-flight sensor incorporating a heating element and a temperature sensor, wherein fluid flow rate is detected through pulsing the heating element to heat the surrounding fluid and measuring a subsequent time lapse provided before the heated fluid is detected by the temperature sensor.

6. The apparatus of claim 5, further comprising a rate flow computer connected to the time-of-flight sensor for computing the flow velocity from the time between pulse and detection across a distance between the heating element and the temperature sensor.

7. The apparatus of claim 5, further comprising the heating element being a pulse heated wire provided within the nozzle, and the temperature sensor is provided downstream from the heating element within the nozzle.

8. The apparatus of claim 5, further comprising the nozzle having a narrowed throat, the pulse heated wire positioned at the throat for heating gas flowing through the nozzle and flowing through the throat, and the temperature sensor positioned at a known distance downstream from the pulse heated wire for sensing temperature of gas adjacent the temperature sensor.

9. The flowmeter of claim 8, wherein pulse heated wire is positioned across the nozzle throat.

10. The apparatus of claim 8, wherein the nozzle has an inlet and wherein a screen and baffle are positioned in the inlet for controlling flow uniformity through the nozzle.

11. The apparatus of claim 8, wherein a disk is positioned in the throat of a nozzle, wherein the disk has a hole commensurate with the throat, the pulse heated wire is connected to an upstream side of the disk and extends into the throat of the nozzle, and wherein the temperature sensor is connected to a downstream side of the disk and extends into a throat of the nozzle.

12. The fluidic flowmeter of claim 1, further comprising a two-stage nozzle connected to the inlet and first and second time-of-flight sensors connected respectively to the first and second stages of the nozzle for sensing relatively low flows through the nozzle and through the inlet, the first and second time-of-flight sensors having respectively a first pulser positioned in the first stage, and a second pulser positioned in the second stage, a first sensor positioned in the first stage and a second sensor positioned in the second stage, for respectively measuring relatively low flows through the first and second stages of the nozzle.

13. A fluidic flowmeter apparatus comprising a low flow range sensor provided in sequence in a fluid flow with a high flow range meter; the high flow range meter being an oscillator-type meter, wherein fluid flow rate is measured by determining the frequency of flow oscillations; the low flow range sensor being a time-of-flight convection sensor, wherein the convection sensor incorporates a pulse heated element and a heat detection element a given distance from the pulse heated element, both pulse heated element and detection element provided within the flow for measuring flow rates, further comprising the low flow rate sensor element provided within a constricted nozzle of the high flow range meter, the constricted nozzle allowing detection of lower flow rates than possible by the high flow rate meter.

14. The fluidic flowmeter apparatus of claim 13, further comprising the two-stage nozzle at the inlet to the oscillator meter, the low flow range sensor being positioned in a first stage of the two-stage nozzle, and a second low flow range sensor positioned in a second stage of the two-stage nozzle, the second low flow range sensor having a second convention sensor incorporating a second pulse heated element and a second heat detection element at a given distance from the second pulse heated element for measuring flow rate in the second nozzle stage.

15. A fluidic flowmeter apparatus comprising a low flow range sensor provided in sequence in a fluid flow with a high flow range meter; the high flow range meter being an oscillator-type meter, wherein fluid flow rate is measured by determining the frequency of flow oscillations; the low flow range sensor being a convection sensor, wherein the convection sensor incorporates a pulse heated element and a heat detection element a given distance from the pulse heated element, both pulse heated element and detection element provided within the flow for measuring flow rates, further comprising the low flow rate sensor element provided within a constricted nozzle of the high flow range meter, the constricted nozzle allowing detection of lower flow rates than possible by the high flow rate meter, further comprising the low flow range sensor being a time-of-flight sensor having a pulse heated wire and a single temperature sensor positioned downstream of the pulse heated wire at a predetermined distance for accurately measuring gas velocities at lower ranges down to 0 velocity.

16. The sensor of claim 15, wherein the pulse heated wire has a diameter of about 25 micrometers and a length of about 2 millimeters and is constructed of tungsten.

17. The apparatus of claim 15, wherein the sensor comprises a tungsten resistance thermometer having a diameter of about 5 micrometers and a length of about 1.25 millimeters.

18. The sensor of claim 15, wherein the pulse heated wire and sensor are positioned parallel to each other and are separated by a distance of about 1 millimeter in the direction of flow.

19. The sensor of claim 15, further comprising a nozzle having a relatively large inlet and a throat positioned adjacent the pulse heated wire.

20. The flowmeter of claim 15, wherein pulse heated wire is positioned downstream from the nozzle throat.

21. The apparatus of claim 15, wherein a disk is positioned in the throat of a nozzle, and wherein the disk has a hole commensurate with the throat, the pulse heated wire is connected to an upstream side of the disk and extends into the throat of the nozzle, and wherein the temperature sensor is connected to a downstream side of the disk and extends into a throat of the nozzle.

22. A method for measuring fluid flow rate comprising a low flow rate sensor upstream from a high flow rate meter, locating the low flow rate sensor in a constricted inlet to the high flow rate meter for measuring flow rates below the range of the high flow rate meter, further comprising measuring low flow rates by utilizing a time-of-flight sensor.

23. The method of claim 22, further comprising measuring low flow rates using a convection sensor provided within the inlet to a high flow rate meter, measuring high flow rates through measuring frequency of oscillations, wherein the high flow rate meter is an oscillation meter.

24. The method of claim 22, further comprising utilizing a time-of-flight sensor incorporating a pulse heated wire provided upstream a known distance within a constricted nozzle from a heat sensor, pulsing the wire and measuring the time lapse until detection by the heat sensor, computing fluid flow rate from the known distance and the measured time lapse.

25. The method of claim 22, wherein the measuring low flow rates further comprises provided a two-stage nozzle with first and second time-of-flight pulsers and sensors respectively positioned at the throat of each stage of the nozzle, pulsing each pulser and sensing the pulser pulses on each sensor, and determining time of flight between the first pulser and sensor and between the second pulser and sensor.

* * * * *